US007199838B2

(12) United States Patent
Lin et al.

(10) Patent No.: US 7,199,838 B2
(45) Date of Patent: Apr. 3, 2007

(54) MOTION ADAPTIVE NOISE REDUCTION APPARATUS AND METHOD FOR VIDEO SIGNALS

(75) Inventors: Peng Lin, Irvine, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 430 days.

(21) Appl. No.: 10/871,729

(22) Filed: Jun. 17, 2004

(65) Prior Publication Data

US 2005/0280739 A1    Dec. 22, 2005

(51) Int. Cl.
*H04N 5/21* (2006.01)

(52) U.S. Cl. ...................... 348/607; 348/701

(58) Field of Classification Search ............... 348/607, 348/700, 701, 618–620, 208.6; 382/107, 382/260, 262, 265
See application file for complete search history.

(56) References Cited

U.S. PATENT DOCUMENTS 5,089,887 A * 2/1992 Robert et al. ............... 348/699
5,276,512 A * 1/1994 Onda ......................... 348/620
5,579,054 A * 11/1996 Sezan et al. ................. 348/452
5,689,305 A * 11/1997 Ng et al. ................ 375/240.15

OTHER PUBLICATIONS

U.S. Appl. No. 10/697,362, filed Oct. 30, 2004, Y.T. Kim.

* cited by examiner

*Primary Examiner*—Victor R. Kostak
(74) *Attorney, Agent, or Firm*—Kenneth L. Sherman, Esq.; Michael Zarrabian, Esq.; Myers Dawes Andras & Sherman, LLP (57) ABSTRACT

A video noise reduction system for a set of video frames that computes a first motion signal using a current frame and multiple consecutive previous frames, computes a second motion signal using the current frame and the processed preceding frame; computes the multi-frame temporal average of the current frame and multiple consecutive previous frames; computes the recursive average of the current frame and the processed preceding frame; generates a temporal filtered signal by soft switching between the multi-frame temporal average and the recursive average based on the first motion signal; applies a spatial filter to the current frame to generate a spatial filtered signal; and combines the temporal filtered signal and the spatial filtered signal based on the second motion signal to generate a final noise reduced video output signal.

18 Claims, 5 Drawing Sheets

MOTION ADAPTIVE NOISE REDUCTION APPARATUS AND METHOD FOR VIDEO SIGNALS

FIELD OF THE INVENTION

The present invention relates generally to video processing, and more particularly to noise reduction in video signals.

BACKGROUND OF THE INVENTION

Video signals are often corrupted by noise during acquisition or transmission processes. Noise is a major source of degradation in picture quality. As TV screens get ever larger, video noise has become more annoying to viewers. Therefore, there has been a need for high quality noise reduction systems to improve video quality.

It is well known that the human eye is more sensitive to noise in still background than that in moving areas where noise is masked by the human visual system. As such, conventional motion adaptive noise reduction methods attempt to reduce video noise accordingly. In such methods, a motion detector is used to detect motion for every pixel in a video frame to generate a motion signal. The motion signal indicates the moving areas and non-moving areas within a video frame. For the non-moving areas a temporal filter is applied to reduce the video noise. For the moving areas the temporal filter is switched off to avoid motion blurring, and instead a spatial filter is applied to reduce noise within each single frame. Although spatial filtering is less effective than temporal filtering for video noise reduction, residual noise left by spatial filtering in moving areas is less perceptible to the human eye.

In general there are two types of temporal filters. One is the temporal averaging filter which takes averaging of multiple successive frames, and the other is the temporal recursive filter which recursively takes averaging between the current frame and the preceding processed frame. When dealing with Gaussian type noise, which is the most common noise in video signals, the temporal averaging filter is preferred. However, the temporal averaging filter is traditionally considered as having two shortcomings. The first shortcoming is that it uses more frame memory because its performance is directly affected by the number of frames used. The second shortcoming is that because it uses multiple frames, the chance that motion occurs among those frames is increased. This makes the temporal averaging filter being switched off to avoid motion blurring, therefore leaving larger noisy areas around moving objects.

As memory costs continue to decrease and consumer demand for high picture quality video products increases, the first shortcoming of the temporal averaging filter has become less important, while the second shortcoming, which directly affects the picture quality, has become a more serious issue.

There is, therefore, a need for a system and method that provides high quality noise reduction and significantly improves video quality.

BRIEF SUMMARY OF THE INVENTION

The present invention addresses the above problems. In one embodiment the present invention provides a motion adaptive video noise reduction system including a first motion detector, a second motion detector, a temporal averaging filter, a temporal recursive filter, an optional spatial filter, and two control units. The first motion detector detects motion among current frame and multiple consecutive previous frames. The second motion detector detects motion between the current frame and the processed preceding frame. Both motion detectors use global noise statistics, which can be calculated using a separate noise estimation unit. The temporal averaging filter uses multiple-frame averaging of current frame and previous frames. The temporal recursive filter takes two-frame averaging of current frame and processed preceding frame.

The first control unit controls the switching between the multi-frame temporal averaging filter and the two-frame temporal recursive filter based on the motion signal generated by the first motion detector. If no motion is detected among multiple frames by the first motion detector, the multiple-frame averaging is used as the temporal filter. If motion is detected among multiple frames by the first motion detector, the two-frame recursive averaging is used as the temporal filter. The switching is performed using a soft switching scheme.

The second control unit controls the switching between the temporal filter and the spatial filter based on the motion signal generated by the second motion detector. If no motion is detected by the second motion detector, the temporal filter configured by the first control unit is applied. If motion is detected by the second motion detector, the temporal filter is switched off to avoid motion blurring, and the spatial filter is switched on. The switching is also performed by using a soft switching scheme.

By soft switching between the multi-frame temporal averaging filter and the two-frame temporal recursive averaging filter, a noise reduction apparatus according to the present invention provides the advantages of the optimal noise reduction of the temporal averaging filter while eliminating its shortcoming of creating larger noisy areas around moving objects.

Other objects, features and advantages of the present invention will be apparent from the following specification taken in conjunction with the following drawings.

DETAILED DESCRIPTION OF THE INVENTION

In one embodiment the present invention provides a motion adaptive video noise reduction system including a first motion detector, a second motion detector, a temporal averaging filter, a temporal recursive filter, an optional spatial filter, and two control units. The first motion detector detects content motion among current frame and multiple consecutive previous frames. The second motion detector detects content motion between the current frame and the processed preceding frame. Both motion detectors use global noise statistics, which can be calculated using a separate noise estimation unit. The temporal averaging filter uses multiple-frame averaging of current frame and previous frames. The temporal recursive filter takes two-frame averaging of current frame and processed preceding frame.

The first control unit controls the switching between the multi-frame temporal averaging filter and the two-frame temporal recursive filter based on the motion signal generated by the first motion detector. If no motion is detected among multiple frames by the first motion detector, the multiple-frame averaging is used as the temporal filter. If motion is detected among multiple frames by the first motion detector, the two-frame recursive averaging is used as the temporal filter. The switching is performed using a soft switching scheme (i.e., change of one process from one state to another gradually to avoid abrupt changes and provide a more natural looking image).

The second control unit controls the switching between the temporal filter and the spatial filter based on the motion signal generated by the second motion detector. If no motion is detected by the second motion detector, the temporal filter configured by the first control unit is applied. If motion is detected by the second motion detector, the temporal filter is switched off to avoid motion blurring, and the spatial filter is switched on. The switching is also performed by using a soft switching scheme.

By soft switching between the multi-frame temporal averaging filter and the two-frame temporal recursive averaging filter, a noise reduction apparatus according to the present invention provides the advantages of the optimal noise reduction of the temporal averaging filter while eliminating its shortcoming of creating larger noisy areas around moving objects.

Figure 1:
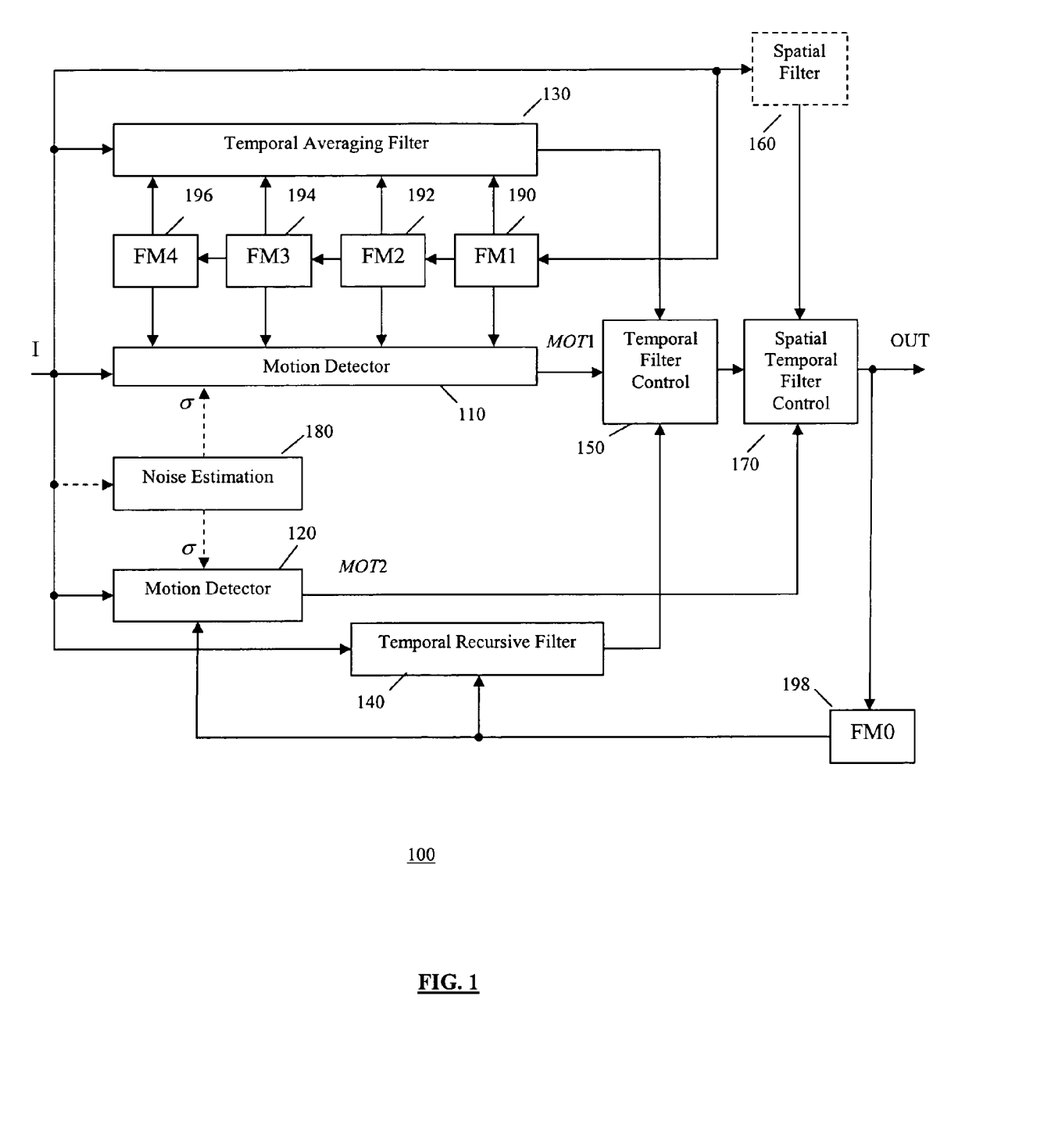
FIG. 1 shows an example functional block diagram of an embodiment of a motion adaptive noise reduction system according to the present invention.

FIG. 1 shows a block diagram of an example motion adaptive noise reduction system 100 according to an embodiment of the present invention, in which e.g. five frames are used for multi-frame temporal averaging filtering. Though five frames are used here by example, those skilled in the art will recognize that the present invention is useful with less or more frames as well. The system 100 comprises a first motion detector 110, a second motion detector 120, a temporal averaging filter 130, a temporal recursive filter 140, a temporal filter control unit (first control unit) 150, an optional spatial filter 160, a spatial temporal filter control unit (second control unit) 170 and a noise estimator 180.

If $f_k(i, j)$ denotes the image intensity of the kth frame at spatial location (i.e., pixel) (i, j) in an input image, then for each pixel (i, j) the first motion detector 110 detects motion among the current input frame $f_k$ and the previous four frames, $f_{k-1}$, $f_{k-2}$, $f_{k-3}$, $f_{k-4}$) which are stored in frame memory units 190, 192, 194 and 196, respectively (designated as FM1, FM2, FM3 and FM4).

Figure 2:
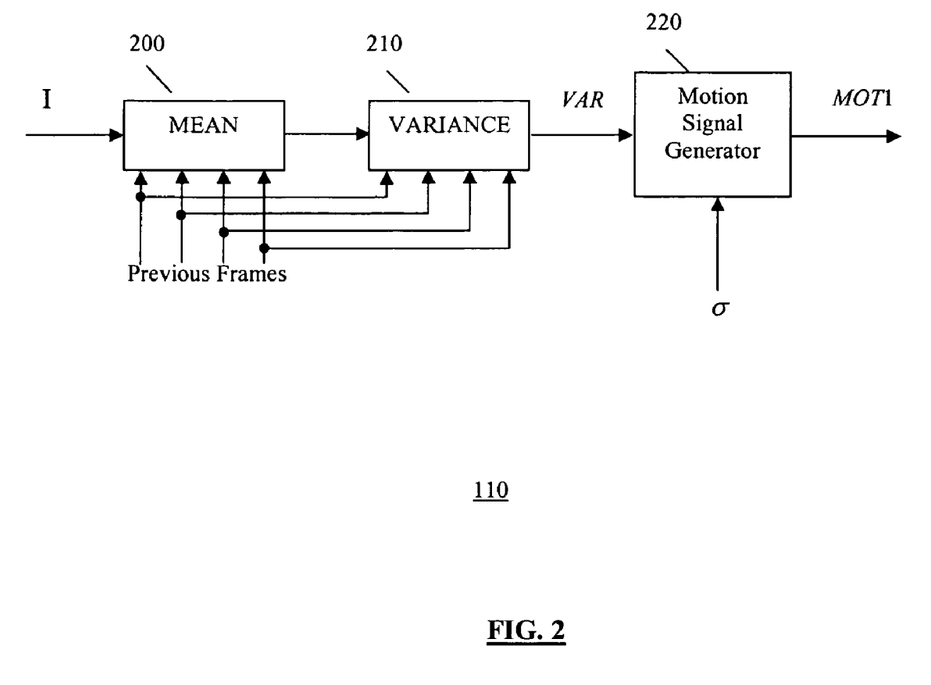
FIG. 2 shows a block diagram of an example embodiment of Motion Detector 1 of FIG. 1.

FIG. 2 shows a block diagram of an example embodiment of the first motion detector 110 comprising a mean calculator 200, a variance calculator 210 and a motion signal generator 220. The mean calculator 200 computes the temporal mean, MEAN, according to the following relation:

$$\text{MEAN} = (f_k(i,j) + f_{k-1}(i,j) + f_{k-2}(i,j) + f_{k-3}(i,j) + f_{k-4}(i,j))/5 \quad (1)$$

Then the variance calculator 210 computes the temporal variance, VAR, according to the following relation:

$$VAR = \left(\sum_{n=0}^{4} |f_{k-n}(i, j) - \text{MEAN}|\right)/5 \quad (2)$$

Those skilled in the art will recognize that other similar measures of the variance can be used with appropriate modifications.

The computed variance VAR is supplied to the motion signal generator 220 to generate a motion signal MOT1. The motion signal generator 220 is also supplied with the global noise standard deviation σ from the noise estimator 180 (FIG. 1). In one example, the global noise standard deviation σ can be calculated using a separate noise estimation unit, such as that described in commonly assigned U.S. patent application Ser. No. 10/697,362, titled "Global and Local Statistics Controlled Noise Reduction System", filed on Oct. 30, 2003, incorporated herein by reference.

Using the global noise standard deviation a and the computed temporal variance VAR, the motion signal generator 220 computes the motion signal MOT1 according to the following relation:

$$\text{MOT1} = \min[T_2(\sigma) - T_1(\sigma), \max(\text{VAR} - T_1(\sigma), 0)]/[T_2(\sigma) - T_1(\sigma)] \quad (3)$$

where min(a, b) is the minimal function that returns the smaller one of the two values a and b, and max(a, b) is the maximal function that returns the larger one of the two values a and b; and $T_1(\sigma)$ and $T_2(\sigma)$ are the lower and upper threshold values, respectively, that depend on the global noise standard deviation σ. Generally, $T_1(\sigma)$ and $T_2(\sigma)$ can be chosen as $T_1(\sigma) = c_1 \cdot \sigma$ and $T_2(\sigma) = c_2 \cdot \sigma$, with two appropriately selected constants $c_1$ and $c_2$ (with $c_1 < c_2$). Preferably, the constants $c_1$ and $c_2$ are selected whereby $T_1(\sigma)$ and $T_2(\sigma)$ represent the threshold values for no-motion and motion, respectively.

Figure 4:
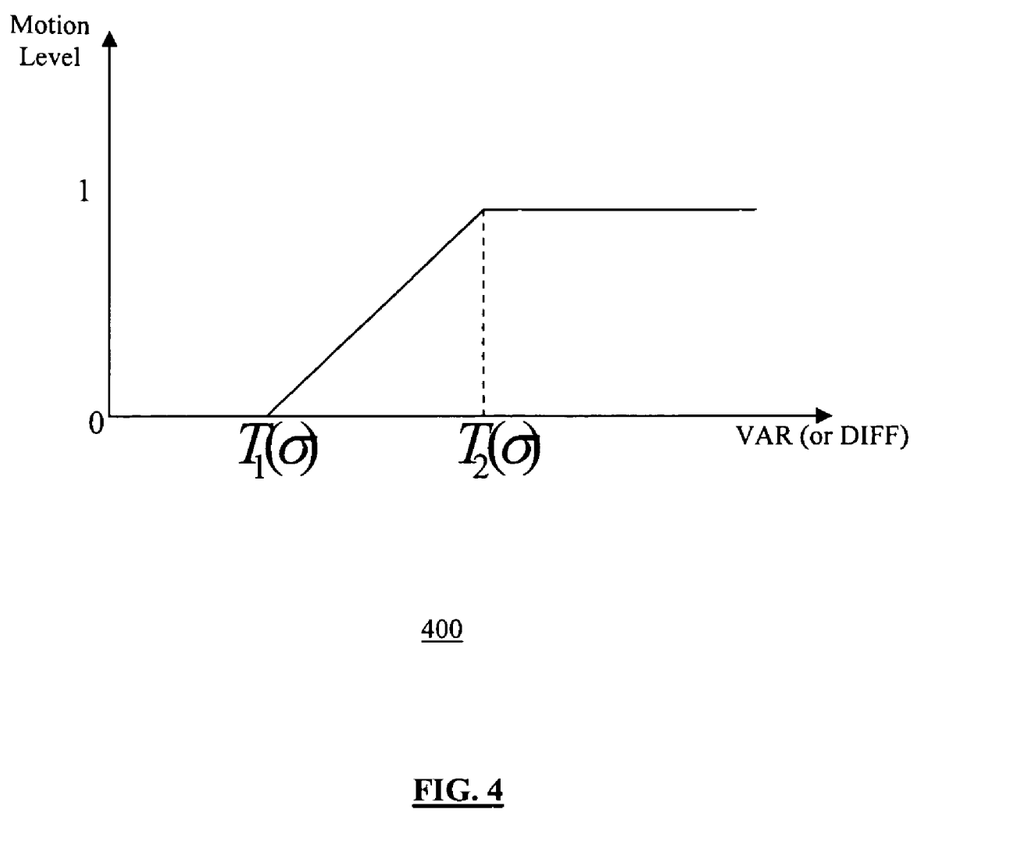
FIG. 4 shows an example graphic curve of the motion signal generated by Motion Detector 1 or 2 of FIG. 1.

FIG. 4 shows an example graph 400 representing the motion signal MOT1, indicating the motion levels among the five frames $f_k$, $f_{k-1}$, $f_{k-2}$, $f_{k-3}$, and $f_{k-4}$. The value of MOT1 are between 0 and 1. The larger the value of MOT1, the higher the motion level. A value of 0 indicates no motion and a value of 1 indicates strong motion.

Figure 3:
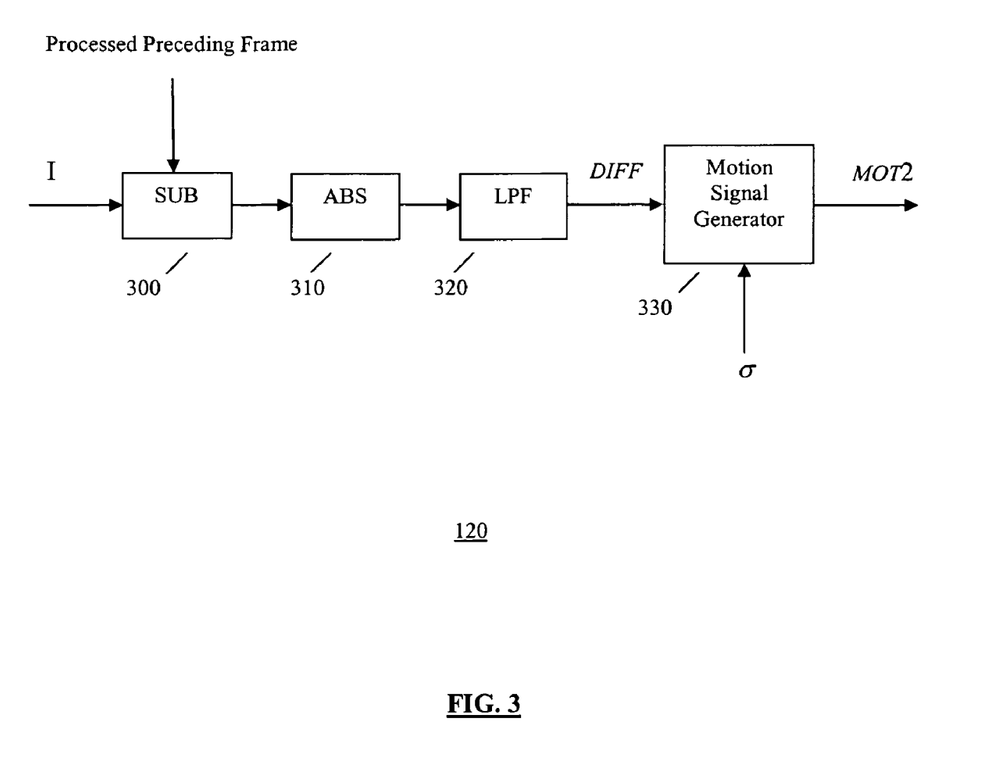
FIG. 3 shows a block diagram of an example embodiment of Motion Detector 2 of FIG. 1.

Referring back to FIG. 1, the second motion detector 120 detects motion between the current frame $f_k$ and the processed preceding frame, which is denoted by $\tilde{f}_{k-1}$, and is stored in the frame memory unit. FIG. 3 shows a block diagram of an example embodiment of second motion detector 120 comprising a subtraction unit(SUB) 300, an absolute value unit (ABS) 310, a low-pass filter (LPF) 320 and a motion signal generator 330.

The SUB 300 subtracts the processed preceding frame from the current frame. Then the ABS 310 takes the absolute value of the subtracted image. Then the LPF 320 applies low-pass filtering (e.g., averaging filter over a 3×3 window) to the resultant image to obtained the smoothed difference image denoted by DIFF. The DIFF image is then supplied to the motion signal generator 330 to generate the motion signal MOT2. The motion signal generator 330 is also supplied with the global noise standard deviation σ from the estimator 180 (FIG. 1), wherein σ can be calculated by a separate noise estimation unit as described above.

Similar to the computation for MOT1, the value MOT2 is computed according to the following relation:

$$\text{MOT2} = \min[S_2(\sigma) - S_1(\sigma), \max(\text{DIFF} - S_1(\sigma), 0)]/[S_2(\sigma) - S_1(\sigma)] \quad (4)$$

wherein the threshold values $S_1(\sigma)=d_1\cdot\sigma$ and $S_2(\sigma)=d_2\cdot\sigma$ with two appropriately selected constants $d_1$ and $d_2$ (with $d_1<d_2$). Preferably, the constants $d_1$ and $d_2$ are selected whereby $S_1(\sigma)$ and $S_2(\sigma)$ represent the threshold values for no-motion and motion, respectively. The representative graph for the motion signal MOT2, which indicates the motion levels between the current frame and the processed preceding frame, is similar to graph 400 for MOT1 as shown by example in FIG. 4.

Referring back to FIG. 1, the temporal averaging filter 130 computes the temporal average, $f_{AVG}$, of the current frame $f_k$ and the previous four frames $f_{k-1}$, $f_{k-2}$, $f_{k-3}$, and $f_{k-4}$ for each pixel (i, j), according to the following relation:

$$f_{AVG}=(f_k(i,j)+f_{k-1}(i,j)+f_{k-2}(i,j)+f_{k-3}(i,j)+f_{k-4}(i,j))/5 \qquad (5)$$

wherein the output $f_{AVG}$ of the temporal averaging filter 130 is supplied to the temporal filter control unit 150.

The temporal recursive filter 140 in FIG. 1 computes the temporal weighted average of the current frame $f_k$ and the processed preceding frame $\bar{f}_{k-1}$ for each pixel (i, j) according to the following relation:

$$f_{REC}=\alpha\cdot f_k(i,j)+\beta\cdot\bar{f}_{k-1}(i,j), \text{ with } \alpha>0,\ \beta>0, \text{ and}$$
$$\alpha+\beta=1 \qquad (6)$$

wherein the output $f_{REC}$ of the temporal recursive filter 140 is also supplied to the temporal filter control unit 150.

The temporal filter control unit 150 controls the soft switching between the output of the temporal averaging filter 130 and the output of the temporal recursive filter 140 based on the motion signal MOT1, which indicates the motion level among the frames $f_k$, $f_{k-1}$, $f_{k-2}$, $f_{k-3}$, and $f_{k-4}$. If there is no motion among the frames $f_k$, $f_{k-1}$, $f_{k-2}$, $f_{k-3}$, and $f_{k-4}$, the output $f_{AVG}$ of the temporal averaging filter 130 is used. If there is motion among the frames $f_k$, $f_{k-1}$, $f_{k-2}$, $f_{k-3}$, and $f_{k-4}$, the output $f_{REC}$ of the temporal recursive filter 140 is used. The soft switching temporal filter control unit is according to the following relation:

$$f_{TMP}=\text{MOT1}\cdot f_{REC}+(1-\text{MOT1})\cdot f_{AVG} \qquad (7)$$

wherein the output $f_{TMP}$ (i.e., temporal filtered signal) of the temporal filter control unit 150 is supplied to the spatial temporal filter control unit 170 where the temporal filtered signal $f_{TMP}$ is combined with a spatial filtered signal from the optional spatial filter 160, or with the original input signal if no spatial filter 160 is used.

The optional spatial filter 160 in FIG. 1 applies spatial filtering to the current frame $f_k$. To avoid spatial blurring, preferably, the spatial filter 160 should be adaptive to both image structure and global noise level, such as that described in the above referenced commonly assigned patent application, incorporated herein by reference. The output of the spatial filter 160, denoted by $f_{SP}$, is supplied to the spatial temporal filter control unit 170. If no spatial filter 160 is used, the original input, which is the current frame $f_k$, is directly passed to the spatial temporal filter control unit 170. In this case $f_{SP}=f_k$.

The spatial temporal filter control unit 170 in FIG. 1 combines the temporal filtered signal $f_{TMP}$ with the spatial filtered signal $f_{SP}$ based on the motion signal MOT2, which indicates the motion level between the current frame $f_k$ and the processed preceding frame $\bar{f}_{k-1}$. If there is no motion, i.e. MOT2=0, the temporal filtered signal $f_{TMP}$ is used. If there is motion, i.e. MOT2=1, the spatial filtered signal $f_{SP}$ is used. In between, $f_{TMP}$ and $f_{SP}$ are mixed together. The combined result is the final output, which can be expressed according to the following relation:

$$f_{OUT}=\text{MOT2}\cdot f_{SP}+(1-\text{MOT2})\cdot f_{TMP} \qquad (8)$$

To continue processing the next frame, the output $f_{OUT}$ is stored in the frame memory unit 198 (FM0 in FIG. 1). Further, other frame memory units, FM1, FM2, FM3, FM4, are updated as follows: the frame stored in FM3 is copied to FM4, the frame stored in FM2 is copied to FM3, the frame stored in FM1 is copied to FM2, and the current frame is copied to FM1. The above operations are continued for the next frame and so on.

Figure 5:
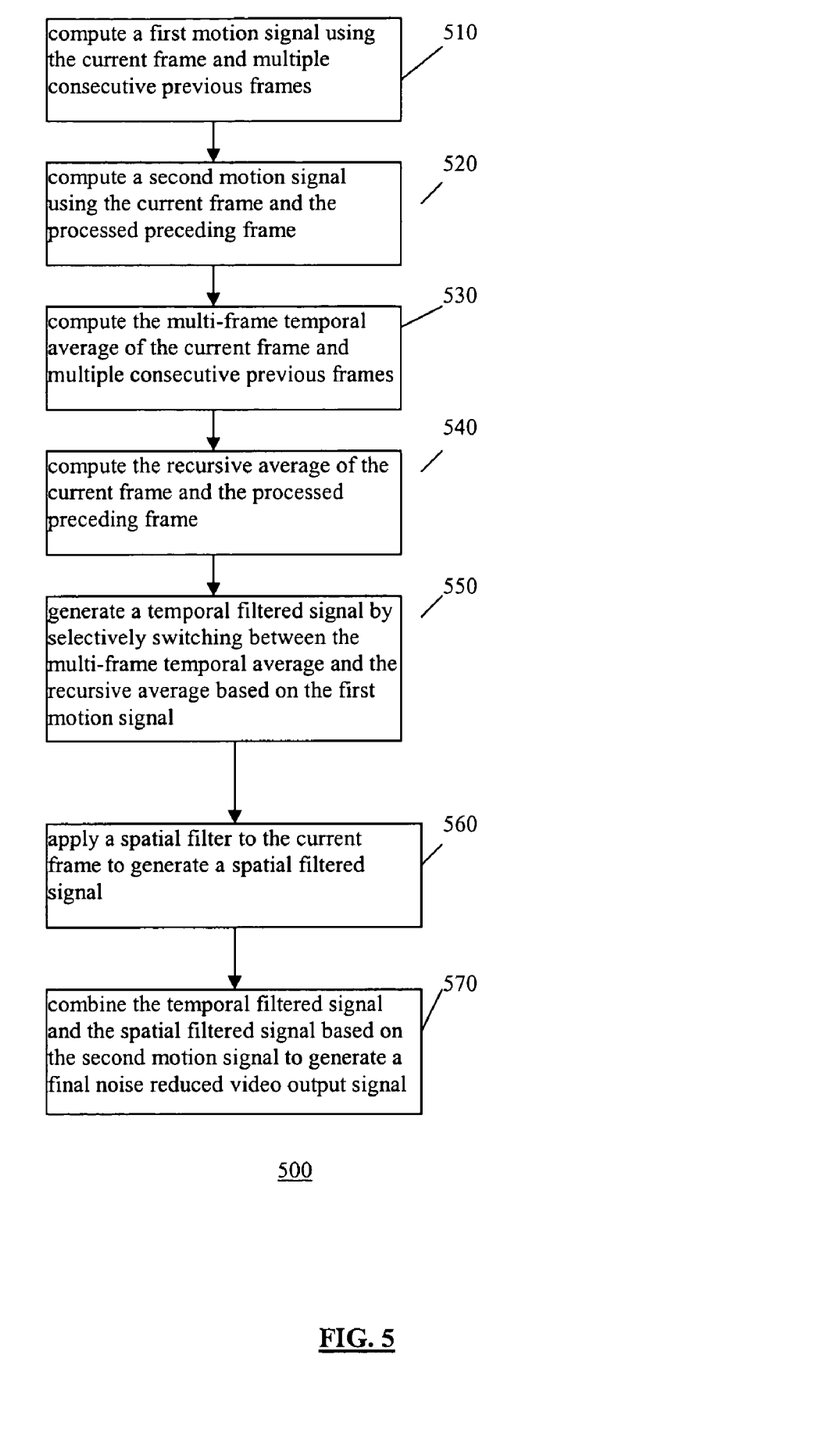
FIG. 5 shows an example flowchart of the steps of a method of video noise reduction according to an embodiment of the present invention.

FIG. 5 shows an example flowchart 500 of the steps of a method of video noise reduction according to an embodiment of the present invention. The example noise reduction method includes the steps of: computing a first motion signal using the current frame and multiple consecutive previous frames (step 510); computing a second motion signal using the current frame and the processed preceding frame (step 520); computing the multi-frame temporal average of the current frame and multiple consecutive previous frames (step 530); computing the recursive average of the current frame and the processed preceding frame (step 540); generating a temporal filtered signal by soft switching between the multi-frame temporal average and the recursive average based on the first motion signal (step 550); applying a spatial filter to the current frame to generate a spatial filtered signal (step 560); and combining the temporal filtered signal and the spatial filtered signal based on the second motion signal to generate a final noise reduced video output signal (step 570).

By soft switching between the multi-frame temporal averaging filter and the two-frame temporal recursive averaging filter, a noise reduction apparatus according to the present invention provides the advantages of the optimal noise reduction of the temporal averaging filter while eliminating its shortcoming of creating larger noisy areas around moving objects.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated. The aforementioned examples in FIGS. 1–3, according to the present invention, can be implemented in many ways, such as program instructions for execution by a processor, as logic circuits, as ASIC, as firmware, etc., as is known to those skilled in the art. Therefore, the present invention is not limited to the example embodiments described herein.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of video noise reduction in a set of video frames, comprising the steps of:
   (a) computing a first motion signal using a current frame and multiple consecutive previous frames, wherein the first motion signal indicates motion between the frames;
   (b) computing a second motion signal using the current frame and the processed preceding frame;
   (c) computing the multi-frame temporal average of the current frame and multiple consecutive previous frames;
   (d) computing the recursive average of the current frame and the processed preceding frame;

(e) generating a temporal filtered signal by switching between the multi-frame temporal average and the recursive average based on the first motion signal;

(f) applying a spatial filter to the current frame to generate a spatial filtered signal; and (g) combining the temporal filtered signal and the spatial filtered signal based on the second motion signal to generate a final noise reduced video output signal.

2. The method of claim 1, wherein:

the first motion signal is further a function of global noise statistics; and the second motion signal is further a function of global noise statistics.

3. The method of claim 1, wherein step (a) further includes the steps of:

computing a temporal mean of the current frame and multiple consecutive previous frames;

computing the corresponding temporal variance VAR based on the mean; and computing the first motion signal MOT1 as a function of the temporal variance VAR.

4. The method of claim 3, wherein the step of computing the first motion signal MOT1 further includes determining the first motion signal MOT1 as:

$$MOT1=\min[T_2(\sigma)-T_1(\sigma),\max(VAR-T_1(\sigma),0)]/[T_2(\sigma)-T_1(\sigma)],$$

where VAR is the computed temporal variance, $T_1(\sigma)$ and $T_2(\sigma)$ are the lower and upper threshold values that depend on global noise standard deviation, $\sigma$.

5. The method of claim 1, wherein step (b) further includes the steps of:

subtracting the processed preceding frame from the current frame;

taking the absolute value of the subtracted image;

applying a low-pass filter to the absolute value of the subtracted image to obtain the smoothed difference image DIFF; and computing the second motion signal, MOT2, as a function of the difference image DIFF.

6. The method of claim 5, wherein the step of computing the second motion signal MOT2 further includes determining the second motion signal MOT2 as:

$$MOT2=\min[S_2(\sigma)-S_1(\sigma),\max(DIFF-S_1(\sigma),0)]/[S_2(\sigma)-S_1(\sigma)]$$

wherein $S_1(\sigma)$ and $S_2(\sigma)$ are lower and upper threshold values, respectively, which depend on the global noise standard deviation, $\sigma$.

7. The method of claim 1, wherein in step (d) the recursive average is a weighted average of the current frame and the processed preceding frame using weighting factors with the sum of the two weighting factors equals to 1.

8. The method of claim 1, wherein in step (e) the temporal filtered signal $f_{TMP}$ is determined by switching between the multi-frame temporal average $f_{AVG}$ and the recursive average $f_{REC}$ as a function of the first motion signal MOT1, such that:

$$f_{TMP}=MOT1 \cdot f_{REC}+(1-MOT1) \cdot f_{AVG}.$$

9. The method of claim 1, wherein in step (g) the temporal filtered signal $f_{TMP}$ and the spatial filtered signal $f_{SP}$ are combined together to generate the output $f_{OUT}$ as a function of the second motion signal MOT2, as:

$$f_{OUT}=MOT2 \cdot f_{SP}+(1-MOT2) \cdot f_{TMP}.$$

10. A video noise reduction system for reducing video noise in a set of video frames, comprising:

(a) a first motion detector that computes a first motion signal using the current frame and multiple consecutive previous frames, wherein the first motion signal indicates motion between the frames;

(b) a second motion detector that computes a second motion signal using the current frame and the processed preceding frame;

(c) an averaging filter that computes the multi-frame temporal average of the current frame and multiple consecutive previous frames;

(d) a recursive filter that computes the recursive average of the current frame and the processed preceding frame;

(e) a first controller that generates a temporal filtered signal by switching between the multi-frame temporal average and the recursive average based on the first motion signal;

(f) a spatial filter that performs spatial filtering on the current frame to generate a spatial filtered signal; and (g) a second controller that combines the temporal filtered signal and the spatial filtered signal based on the second motion signal to generate a final noise reduced video output signal.

11. The system of claim 10, wherein:

the first motion signal is further a function of global noise statistics; and the second motion signal is further a function of global noise statistics.

12. The system of claim 10, wherein the first motion detector comprises:

a mean calculator that computes a temporal mean of the current frame and multiple consecutive previous frames;

a variance calculator that computes the corresponding temporal variance VAR based on the mean; and a first motion signal generator that generates the first motion signal MOT1 as a function of the temporal variance VAR.

13. The system of claim 12, wherein the first motion signal generator generates the first motion signal MOT1 as:

$$MOT1=\min[T_2(\sigma)-T_1(\sigma),\max(VAR-T_1(\sigma),0)]/[T_2(\sigma)-T_1(\sigma)],$$

where VAR is the computed temporal variance, $T_1(\sigma)$ and $T_2(\sigma)$ are the lower and upper threshold values that depend on global noise standard deviation, $\sigma$.

14. The system of claim 10, wherein the second motion detector comprises:

a subtractor that subtracts the processed preceding frame from the current frame;

an absolute value block that takes the absolute value of the subtracted image;

a low-pass filter that performs low-pass filtering on the absolute value of the subtracted image to obtain the smoothed difference image DIFF; and a second motion signal generator that generates the second motion signal, MOT2, as a function of the difference image DIFF.

15. The system of claim 14, wherein the second motion signal generator generates the second motion signal MOT2 as:

$$MOT2=\min[S_2(\sigma)-S_1(\sigma),\max(DIFF-S_1(\sigma),0)]/[S_2(\sigma)-S_1(\sigma)]$$

wherein $S_1(\sigma)$ and $S_2(\sigma)$ are lower and upper threshold values, respectively, which depend on the global noise standard deviation, $\sigma$.

16. The system of claim 10, wherein the recursive average filter determines the recursive average as a weighted average of the current frame and the processed preceding frame using weighting factors with the sum of the two weighting factors equals to 1.

17. The system of claim 10, wherein the first controller generates the temporal filtered signal $f_{TMP}$ by switching between the multi-frame temporal average $f_{AVG}$ and the recursive average $f_{REC}$ as a function of the first motion signal MOT1, such that:

$$f_{TMP} = MOT1 \cdot f_{REC} + (1-MOT1) \cdot f_{AVG}.$$

18. The system of claim 10, wherein the second controller generates the output $f_{OUT}$ by combining the temporal filtered signal $f_{TMP}$ and the spatial filtered signal $f_{SP}$ as a function of the second motion signal MOT2, as:

$$f_{OUT} = MOT2 \cdot f_{SP} + (1-MOT2) \cdot f_{TMP}.$$

* * * * *